(12) United States Patent
Ng et al.

(10) Patent No.: US 6,174,086 B1
(45) Date of Patent: Jan. 16, 2001

(54) LINEAR MOTION BEARING ASSEMBLY

(75) Inventors: Alison Ng, New York; Steven Feketa, Stony Brook, both of NY (US)

(73) Assignee: Thomson Industries, Inc., Port Washington, NY (US)

( * ) Notice: Under 35 U.S.C. 154(b), the term of this patent shall be extended for 0 days.

(21) Appl. No.: 09/273,289

(22) Filed: Mar. 19, 1999

(51) Int. Cl.[7] .................................................. F16C 29/04
(52) U.S. Cl. ................................................ 384/45; 394/49
(58) Field of Search ................................ 384/43, 44, 45, 384/49, 55

(56) References Cited

U.S. PATENT DOCUMENTS

| 4,775,247 | * | 10/1988 | Isert | 384/45 |
| 5,244,283 | * | 9/1993 | Moritia | 384/45 |
| 5,431,498 | * | 7/1995 | Lyon | 384/45 |
| 5,613,780 | | 3/1997 | Ng | 384/43 |

* cited by examiner

Primary Examiner—Sherry Estremsky
(74) Attorney, Agent, or Firm—Dilworth & Barrese

(57) ABSTRACT

A linear motion bearing assembly is disclosed and preferably includes an elongated rail member and a carriage housing defining an inner cavity for receiving at least one segment bearing. The bearings can be either bearing balls or rollers. The elongated rail member is formed with an inner race portion, a flange projection and an elongated mounting slot substantially along the entire length thereof. Both the elongated rail member and carriage housing are precision formed by manufacturing techniques including drawing, stamping, extruding and rolling.

18 Claims, 5 Drawing Sheets

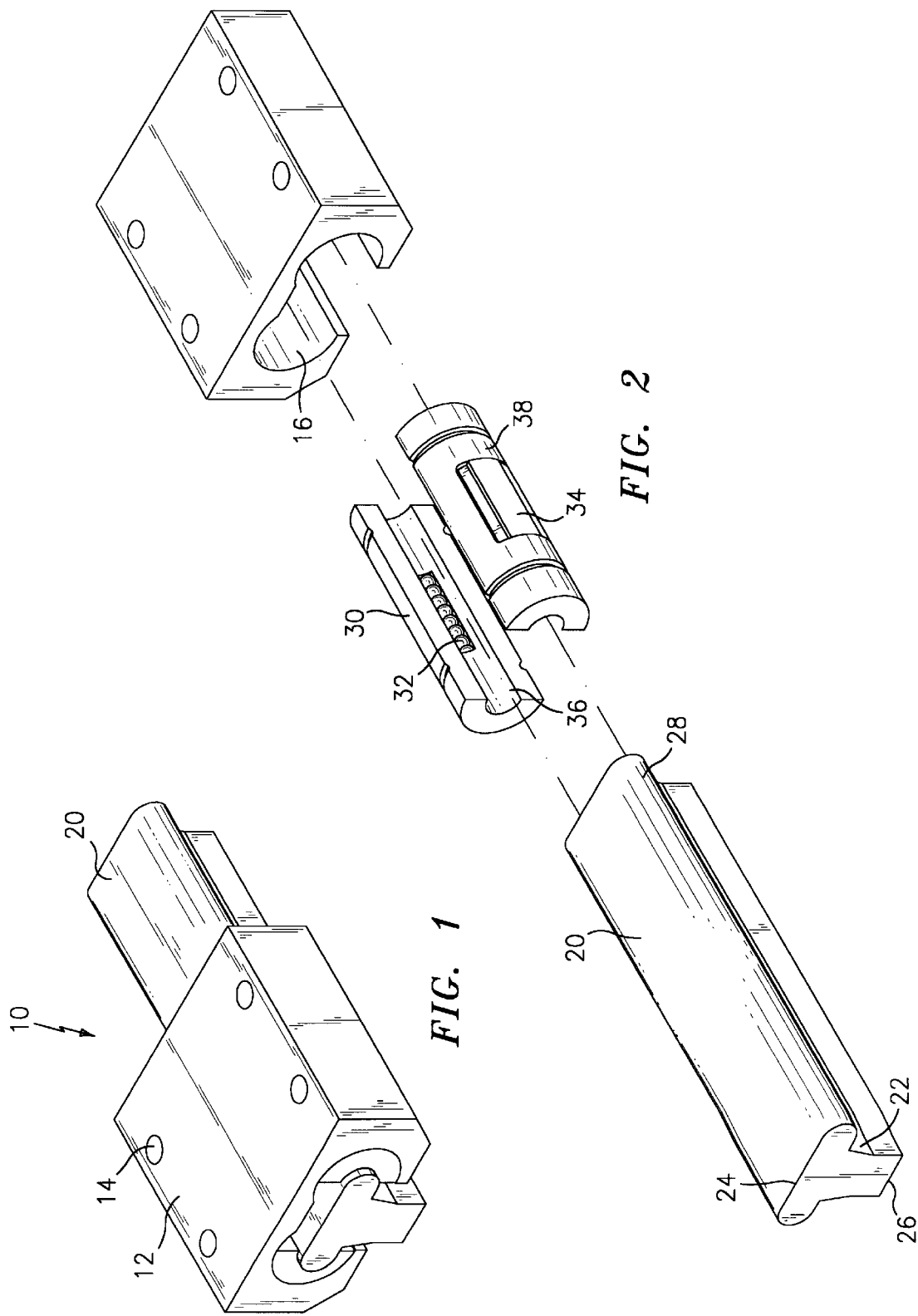

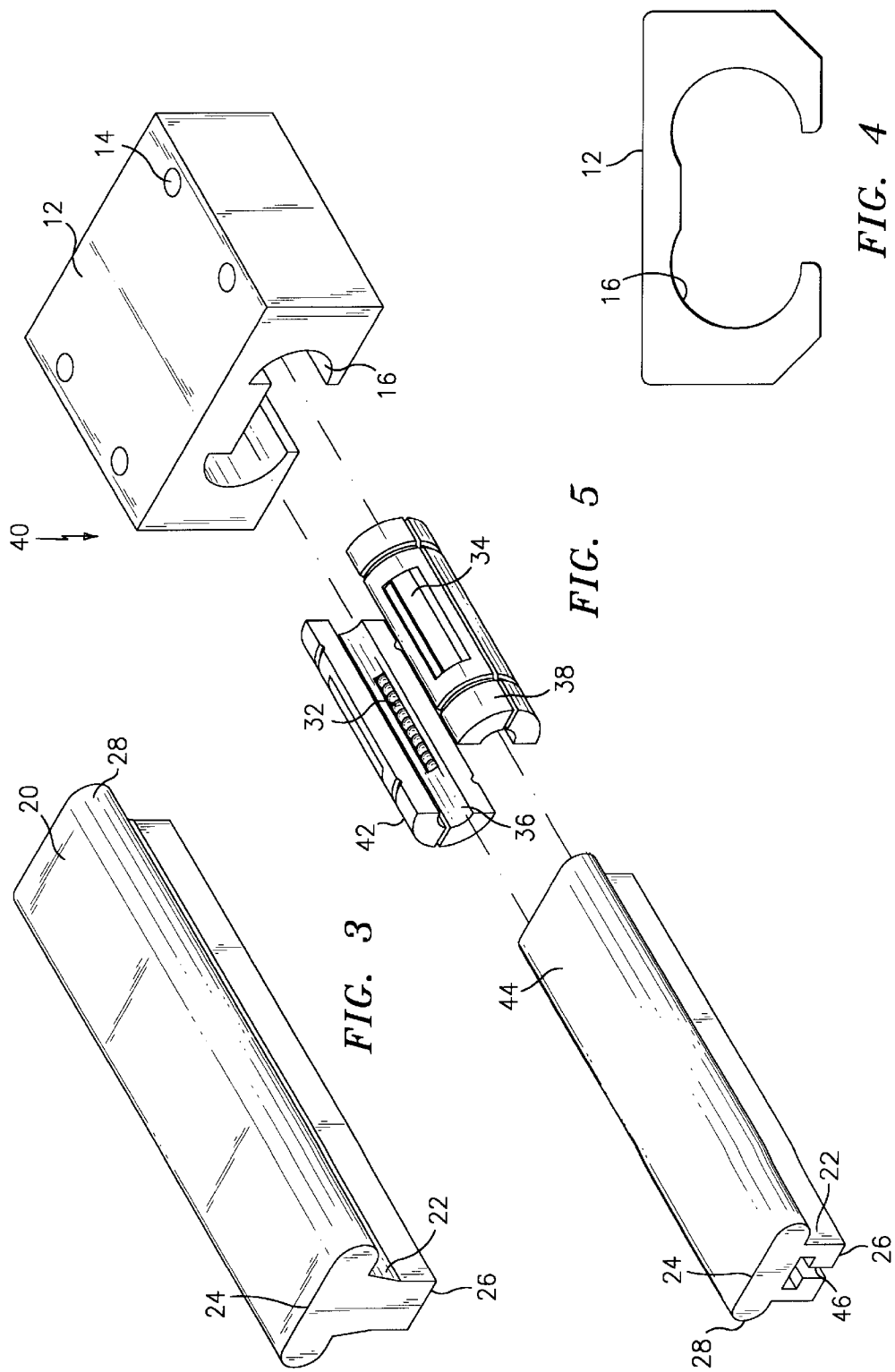

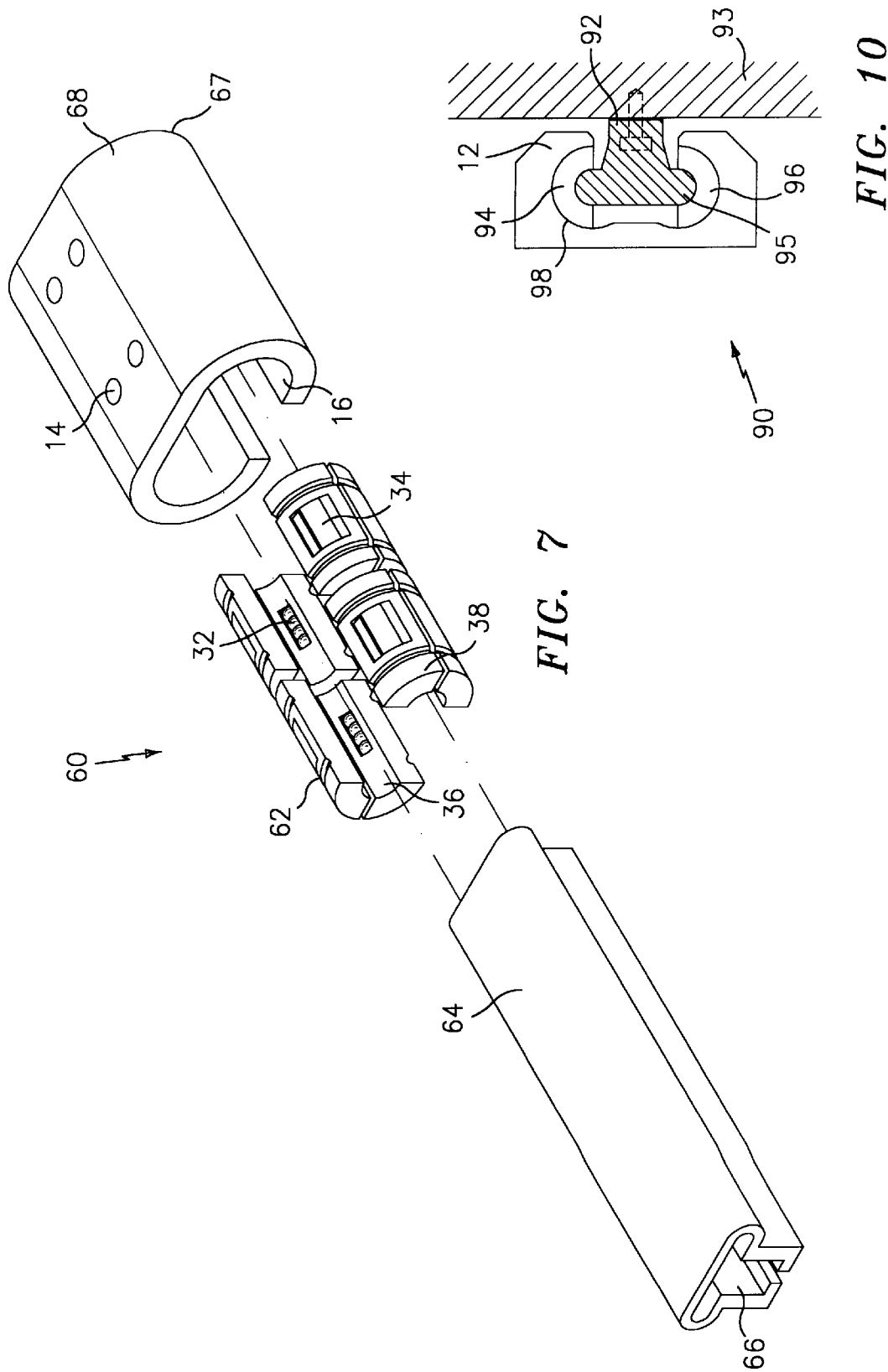

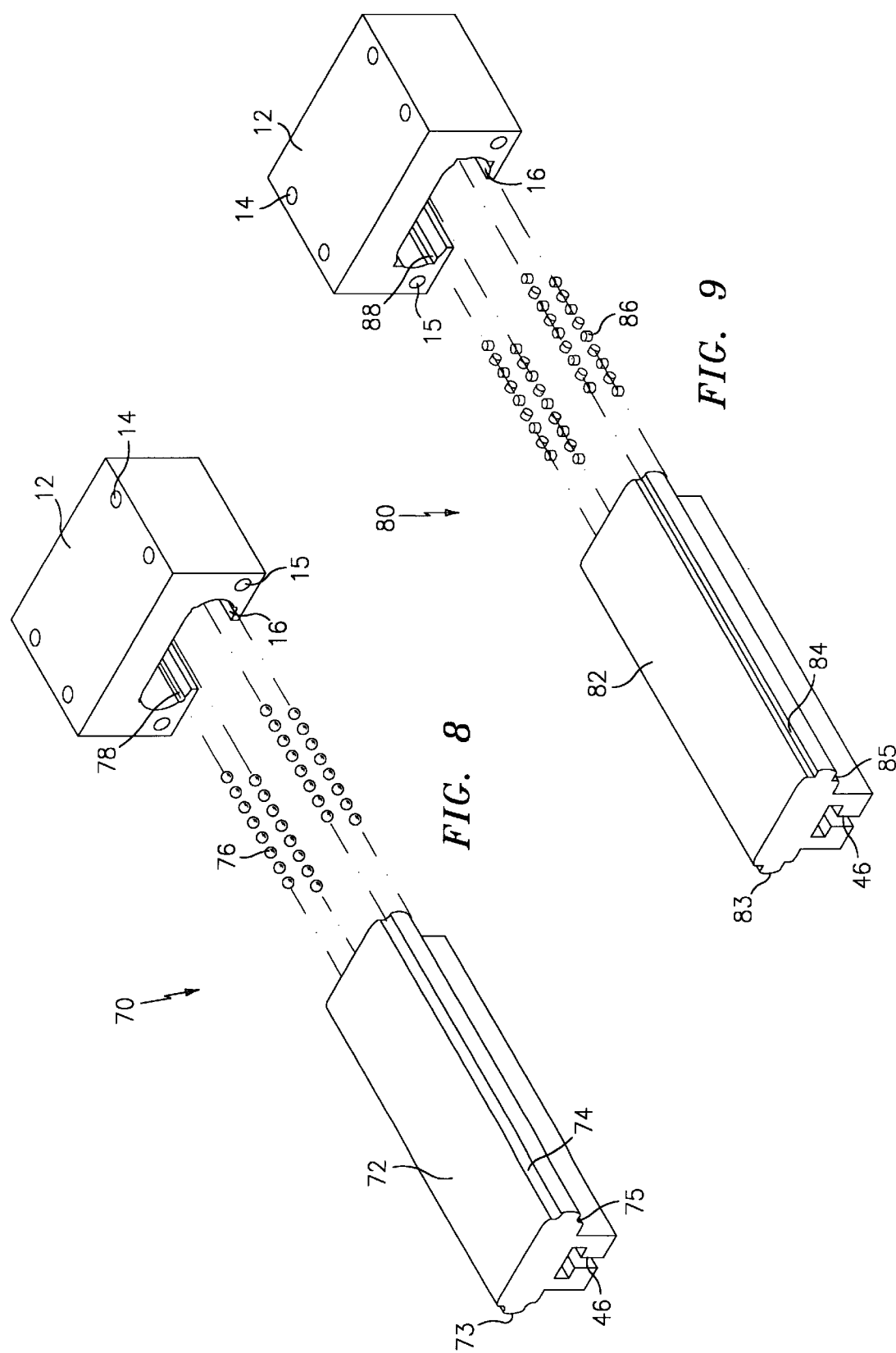

LINEAR MOTION BEARING ASSEMBLY

BACKGROUND

1. Technical Field

The present disclosure generally relates to linear motion bearing assemblies and, more particularly, is directed to a novel low cost linear motion bearing assembly employing a segment bearing type carriage housing for longitudinal movement along a rail member.

2. Background of the Related Art

The present disclosure is directed to a linear motion bearing assembly which includes a carriage housing having segment linear bearing members housed therein for longitudinal movement along a novel rail member. The improvements relate to the design, manufacture, assembly and performance of the system as compared to prior art systems, as well as, the formation of the rail member and carriage housing.

Prior art rail and segment bearing carriage systems generally consist of a carriage housing and bearing portion running along an elongated rail member. Typically, the rail members are first drawn to an elongated form and subsequently ground along a longitudinal edge thereof to form a race and flange portion. Similarly, the carriage housings are drawn or stamped to a general formation and then subsequently ground to form corresponding grooves for accommodating the race and flange portions of the rail members. In addition, mounting of the prior art systems further requires the additional step of forming bores along the rail member and carriage housing. All of these forming steps of manufacture add to the time and cost for prior art bearing systems.

Accordingly, a need exists in the art for a new and improved linear motion bearing assembly which is easily and efficiently manufactured, includes fewer parts, provides smoother operation and results in lower manufacture cost.

It is an object of the present invention to provide a linear motion bearing assembly having a rail member which is precision drawn or extruded to appropriate shape and size thus eliminating many of the processing steps of the prior art rail members.

It is another object of the present invention to provide a linear motion bearing assembly having an outer carriage housing which is stamped, drawn, extruded or cast to proper specifications.

It is another object of the present invention to provide a linear motion bearing assembly with a rail member having precision drawn inner races or grooves.

It is a further object of the present disclosure to provide a linear motion bearing assembly wherein the rail member can be manufactured from a single piece of stock material.

It is yet another object of the present disclosure to provide a linear motion bearing assembly wherein the rail member can be roll formed.

It is yet another object of the present invention to provide a linear motion bearing assembly wherein the precision drawing or extrusion process will typically yield accuracies sufficient enough to use lengths of wire for forming rail members.

It is a further object of the present invention to provide a linear motion bearing assembly which can be manufactured of metals, polymers or a combination thereof.

Therefore, the embodiments herein disclosed throughout the present disclosure achieve the intended purposes, objects, and advantages through a new, useful and unobvious combination of component elements, with the use of a minimum number of functioning parts, at a reasonable cost to manufacture, and by employing readily available materials.

SUMMARY

The present disclosure is directed to a linear motion bearing assembly for longitudinal movement of a carriage along a rail member. The system is simpler in construction and includes a lower cost of manufacture. The linear motion bearing assembly preferably includes an elongated rail member and a carriage housing movably mounted thereon. The assembly further includes at least one segment linear motion bearing mounted in the carriage housing. The linear motion bearings can include both bearing balls or barrel-type rollers.

The elongated rail member may be formed with an inner race portion, a flange projection and optionally, an elongated mounting slot substantially along the entire length thereof. The carriage housing is formed including a groove portion for coupling at least one segment linear motion bearing. Both the elongated rail member and carriage housing are preferably precision formed by manufacturing techniques including drawing, stamping, extruding and rolling.

In an alternate embodiment, the linear motion bearing assembly includes an elongated rail member having an elongated T-shaped mounting slot, an inner race portion and a flange projection substantially along a length thereof. The assembly further includes a carriage housing having at least one bearing member for movement along the inner race portion and flange projection of the elongated rail member. The carriage housing further defines an inner cavity for receiving the at least one segment bearing. The segment bearing may be configured for either bearing balls or rollers.

The elongated rail member may be formed with elongated T-shaped mounting slot. Both the elongated rail member and the carriage housing are precision formed by manufacturing techniques including drawing, stamping, extruding and rolling.

BRIEF DESCRIPTION OF THE DRAWINGS

The objects and features of the present disclosure are set forth with particularity in the appended claims. The present disclosure, both as to its organization and manner of operation, together with further objectives and advantages may best be understood by reference to the following description, taken in connection with the accompanying drawings, in which:

FIG. 1 is a perspective view illustrating a linear motion bearing assembly according to the present disclosure;

FIG. 2 is an exploded perspective view of the linear motion bearing assembly of FIG. 1;

FIG. 3 is a perspective view of the rail member of FIG. 1;

FIG. 4 is an end view of the carriage housing of FIG. 1 with the segment bearings removed;

FIG. 5 is an exploded perspective view illustrating an alternate linear motion bearing assembly according to the present disclosure;

FIG. 7 is exploded perspective view illustrating a further alternate linear motion bearing assembly according to the present disclosure;

FIG. 8 is an exploded perspective view illustrating a linear motion bearing assembly incorporating ball-type bearings between the carriage housing and rail member;

FIG. 9 is an exploded perspective view illustrating a linear motion bearing assembly incorporating roller bearings between the carriage housing and rail member; and FIG. 10 is a cross-sectional plan view illustrating a linear motion bearing assembly incorporating a single segment bearing and a segment bearing stabilizer.

DETAILED DESCRIPTION OF PREFERRED EMBODIMENTS

Figure 6:
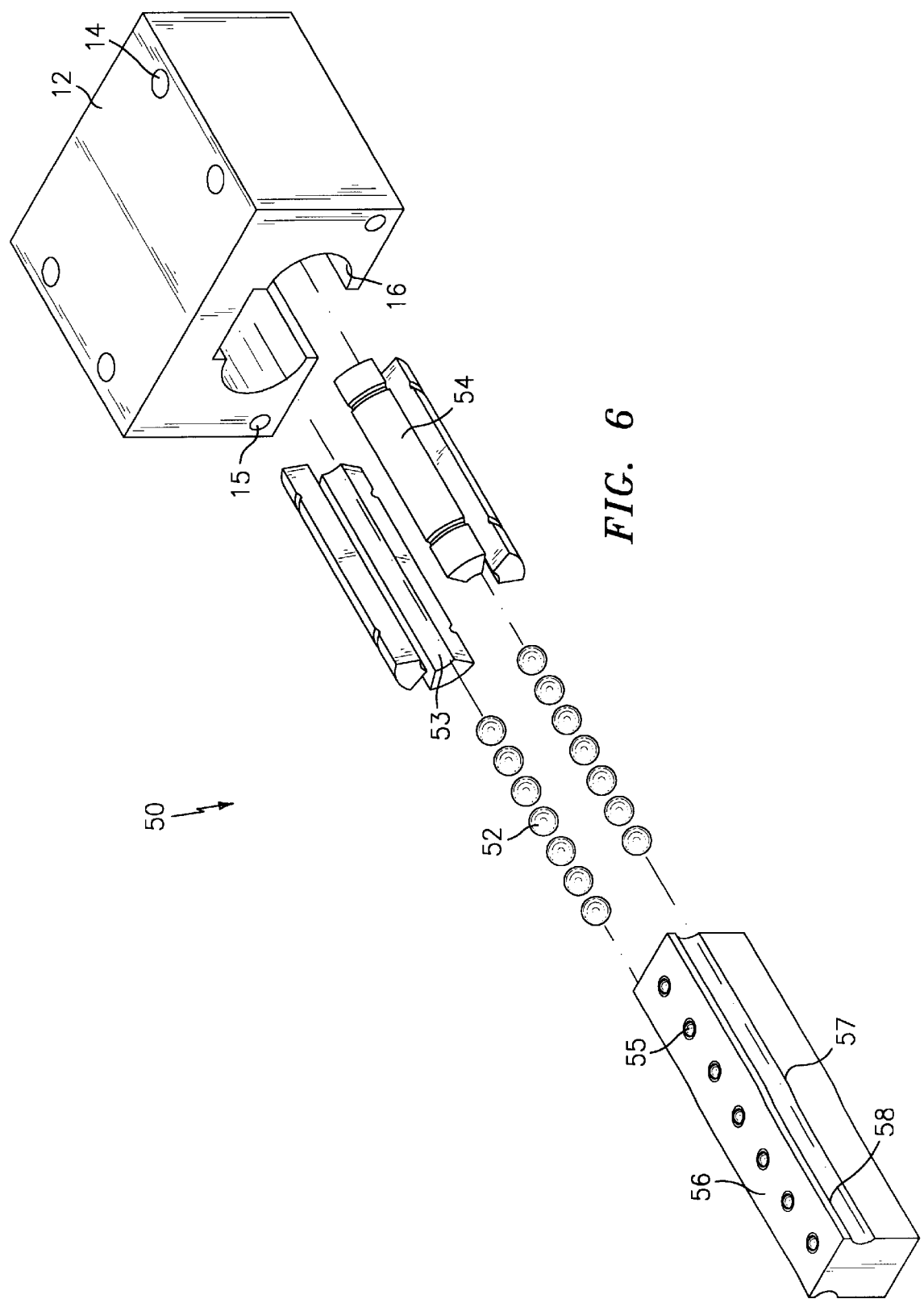
FIG. 6 is an exploded perspective view illustrating another alternate linear motion bearing assembly according to the present disclosure.

The preferred embodiments of the assemblies disclosed herein are discussed in terms of rail and segment bearing carriage housing assemblies. The present disclosure is equally applicable to systems which utilize carriage units traveling along conveyor or rail systems and including various bearing structures housed therein.

Reference will now be made in detail to the preferred embodiments of the disclosure, which are illustrated in the accompanying figures. Turning now to the figures, wherein like components are designated by like reference numerals throughout the various figures, attention is first directed to FIGS. 1–4 which depict a linear motion bearing assembly 10. Assembly 10 includes a carriage housing 12 for linear movement along a track or rail member 20. Carriage housing 12 is configured with mounting bores 14 for mounting articles such as tooling or machinery to the carriage housing 12 for transportation along a system route. It is to be understood, as is known in the art, that alternative methods of mounting carriage housing 12 to the articles may include clamping, welding, slot fitting and the like.

Carriage housing 12 defines a cavity 16 for accommodating bearing structure, preferably a segment bearing 30. Segment bearings 30 are securely fitted within cavity 16 of carriage housing 12 and are configured for reciprocal movement along rail member 20. Carriage housing 12 may be formed by known methods including stamping, drawing, rolling, casting or extrusion.

Rail member 20 includes a "T" or mushroom-type profile having a wide upper portion 24 and a narrow lower portion 26, although, other shaped profiles such as circular, elliptical, rectangular, B-shaped, U-shaped and the like are contemplated. Rail member 20 includes at least one inner race or groove 22 extending along a length of rail member 20. Extending longitudinally along rail member 20 are oppositely situated first and second flange portions 28 which engage loaded balls or rollers in segment bearings 30 as carriage housing 12 travels along rail member 20. Flange portion 28 is preferably shaped in a round geometry or any geometry which conforms to an inner periphery of bearing segments 30. Both the inner race 22 and flange portion 28 are sized to conform with the particular shape of the bearing structure within carriage housing 12. Rail member 20 is preferably manufactured using precision drawing, rolling or extruding techniques to form rail member 20 as a single piece rail. These manufacturing techniques also form the inner race or groove portions 22 and flange portions 28 of rail member 20, thus eliminating additional manufacturing steps in production.

The linear motion bearing assembly 10 according to the present disclosure may include a variety of segment bearings, for facilitating movement of carriage housing 12 along elongated rail member 20. See, for example, commonly owned U.S. Pat. No. 5,613,780 to Ng, the entire contents of which are herein expressly incorporated by reference.

In assembly 10, segment bearings 30 include an arcuate outer periphery 38 shaped to conform with a portion of cavity 16 of carriage housing 12. An inner arcuate periphery 36 is sized to accommodate inner race 22 and flange portion 28 of rail member 20. Movement of carriage housing 12 along elongated rail member 20 is facilitated by bearing balls or rollers 32. Bearing balls 32 provide for a smooth transport of carriage housing 12 along rail member 20 and also aid in the absorption of loading forces being distributed from flange portion 28. The loading forces are passed from bearing balls 32 to load bearing plate 34 for dispersion to carriage housing 12. One skilled in the art will readily appreciate that assembly 10 can include one or more segment bearing configurations including but not limited to closed-type and open-type bearings and which use either bearing balls or bearing rollers.

The linear motion bearing assemblies of the present disclosure can be manufactured to various size parameters. These assemblies can be manufactured to minute overall dimensions, e.g., rail members with widths of 1 mm, and have the advantage of being employed with tooling or machinery which requires precise controlled movements.

Turning now to alternate embodiments, as featured in FIGS. 5–10, the overall structural and operational features of linear motion bearing assemblies 40, 50, 60, 70, 80 and 90 are very similar to those described above for assembly 10. Accordingly, the following description will focus on those features which are either unique to assemblies 40, 50, 60, 70, 80 and 90 or are substantially different to corresponding elements of assembly 10.

With particular reference to FIG. 5, assembly 40 includes a rail member 44 having an elongated mounting slot portion 46 generally formed in the shape of a "T". Mounting slot 46 runs along rail member 44 and is designed to accommodate fastening attachments such as bolts, nuts, screws and the like. Assembly 40 further includes segment bearings 42 which are specifically designed to be fixed within the cavity 16 of carriage housing 12 and to run along inner race 22 and flange portion 28 of rail member 44.

FIG. 6 illustrates an alternate embodiment of a linear motion bearing assembly 50 with a rail member 56 having bores 55 formed therein. The bores 55 are designed to facilitate fastening of the rail member 56 to surrounding structure. Rail member 56 further includes an inner race or groove 57 and flange portion 58 along a length thereof. Segment load bearing members 54 defining tracks 53 are securely fitted within cavity 16 of carriage housing 12 and together with grooves 57 form tracks for bearing balls 52. As carriage housing 12 travels along rail member 56, bearing balls 52 spin or roll between tracks 53 and inner race 57, Bearing ball return holes 15 are formed through carriage housing 12 for receiving bearing balls 52 therethrough in a looping manner as carriage housing 12 slides along track 53 and rail member 56. End caps (not shown) are included on an end portion of carriage housing 12 to confine bearing balls 52 within carriage housing 12.

Referring now to FIG. 7, another preferred embodiment of a linear motion bearing assembly 60 is shown. Assembly 60 includes a plurality of self-contained segment bearings 62 formed to fit within cavity 16 of carriage housing 68. Preferably, assembly 60, particularly carriage housing 68 and rail member 64, is formed from sheet metal that has undergone a stamping, roll forming or drawing process. It is also contemplated that other known manufacturing methods can be used with the disclosed embodiments. A curved outer periphery 67 provides a low profile for carriage housing 68.

Rail portion 64 includes an enlarged inner area having a mounting slot portion 66 generally formed in the shape of a "T". Mounting slot portion 66 runs along rail member 64 and is designed to accommodate fastening attachments such as bolts, nuts, screws and the like.

With reference to FIG. 8, an alternate embodiment of a linear motion bearing assembly 70 is shown. Assembly 70 includes an elongated rail member 72 having extended flange portions 73 which include respective upper and lower ball grooves or races 74 and 75. Rail member 72 further includes an elongated mounting slot portion 46 generally formed in the shape of a "T". Mounting slot 46 runs along a lower portion of rail member 72 and is designed to accommodate fastening attachments such as bolts, nuts, screws and the like. Carriage housing 12 includes a corresponding groove portion 78 along inner cavity 16 for accommodating bearing balls 76. Groove portion 78 maintains bearing balls 76 within inner cavity 16 which allows carriage housing 12 to travel along respective upper 74 and lower 75 bearing ball conforming grooves of rail member 72. Bearing ball return holes 15 are formed through carriage housing 12 for receiving bearing balls 76 therethrough in a looping manner as carriage housing 12 slides along grooves 74 and 75 and rail member 72. End caps (not shown) are included on an end portion of carriage housing 12 to confine bearing balls 76 within carriage housing 12.

Now referring to FIG. 9, an alternate embodiment of a linear motion bearing assembly 80 is shown. Assembly 80 includes an elongated rail member 82 having extended flange portions 83 which include respective upper and lower roller grooves or races 84 and 85. Rail member 82 further includes an elongated mounting slot portion 46 generally formed in the shape of a "T". Carriage housing 12 includes a groove portion 88 along inner cavity 16 for accommodating rollers 86. Groove portion 88 maintains rollers 86 within inner cavity 16 which allows carriage housing 12 to travel along respective upper 84 and lower 85 bearing barrel roller conforming grooves of rail member 82. Bearing ball return holes 15 are formed through carriage housing 12 for receiving bearing rollers 86 therethrough in a looping manner as carriage housing 12 slides along grooves 84 and 85 and rail member 82. End caps (not shown) are included on an end portion of carriage housing 12 to confine rollers 86 within carriage housing 12.

Now referring to FIG. 10, an alternate embodiment of a linear motion bearing assembly according to the present disclosure is illustrated. Linear motion bearing assembly 90 depicts a linear motion bearing system employing the use of a single segment bearing 94 and a segment bearing stabilizer 96. It is contemplated that a single bearing segment and/or segment bearing stabilizer, as is shown in FIG. 10, can be utilized throughout all the embodiments presented in the present disclosure. The orientation of assembly 90 administers the loading forces of carriage housing 12 and structures attached thereto upon rail member 92 through single segment bearing 94. Segment bearing stabilizer 96 is primarily used to provide stabilizing support for carriage housing 12 as it is transported along rail member 92. Assembly 90 further includes carriage housing 12 having a groove portion 98 along an inner cavity for accommodating single segment bearing 94. Rail member 92 can be mounted to a wall 93 or any other structure as is known in the art by known mounting methods. Elongated rail member 92 includes extended flange portions 95 and respective upper and lower bearing grooves or races (not shown).

It will be understood that various modifications may be made to the embodiments disclosed herein. For example, the entire system may be manufactured from a combination of polymers and/or metals. The rail members and carriage housings can be formed by drawing, extruding, casting, stamping or rolling processes. Also, the rail members may include bores and/or mounting slot portions formed in a variety of shapes which can accommodate the fastening attachments. Therefore, the above description should not be construed as limiting, but merely as exemplifications of preferred embodiments. Those skilled in the art will envision other modifications within the scope and spirit of the claims appended hereto.

What is claimed is:

1. A linear motion bearing assembly rail and carriage system comprising:
   an elongated rail member having a substantially T-shaped cross sectional configuration;
   a carriage housing movably mounted on the elongated rail member, the carriage housing defining an inner cavity; and
   at least one self-contained segment bearing mounted in the inner cavity of the carriage housing, the at least one self-contained segment bearing supporting the carriage housing for movement along the elongated rail member.

2. A linear motion bearing assembly rail and carriage system comprising:
   an elongated rail member having a substantially T-shaped cross sectional configuration;
   a carriage housing movably mounted on the elongated rail member, the carriage housing defining an inner cavity;
   at least one segment bearing mounted in the inner cavity of the carriage housing, the at least one segment bearing supporting the carriage housing for movement along the elongated rail member; and
   a segment bearing stabilizer mounted within the inner cavity of the carriage housing and opposite the at least one segment bearing.

3. The linear motion bearing assembly according to claim 2, wherein the elongated rail member includes a race portion substantially along the entire longitudinal length thereof.

4. The linear motion bearing assembly according to claim 2, wherein the elongated rail member includes an elongated mounting slot extending substantially along the entire length thereof.

5. The linear motion bearing assembly according to claim 4, wherein the elongated rail member is monolithically formed to define the elongated mounting slot.

6. The linear motion bearing assembly according to claim 2, wherein the carriage housing is configured to mount a plurality of self-contained segment bearing members.

7. The linear motion bearing assembly according to claim 6, wherein the carriage housing is monolithically formed to the group consisting of: drawing, stamping, extruding and rolling.

8. A linear motion bearing assembly comprising:
   an elongated rail member including an upper portion and a lower portion, the upper portion forming a flange projection, the lower portion including a mounting slot;
   a carriage housing defining an inner cavity, the inner cavity sized to receive at least the flange projection of the elongated rail member; and
   at least one self-contained segment bearing mounted in the inner cavity of the carriage housing and engaging the flange projection of the elongated rail member.

9. The linear motion bearing assembly according to claim 8, wherein the elongated rail member is formed including the flange projection and the mounting slot substantially along the entire length thereof.

10. The linear motion bearing assembly according to claim 9, wherein the elongated rail member is monolithically formed to define the mounting slot.

11. The linear motion bearing assembly according to claim 8, wherein the carriage housing is configured to mount a plurality of self contained segment bearing members.

12. The linear motion bearing assembly according to claim 11, wherein the carriage housing is monolithically formed to define the inner cavity.

13. A linear motion bearing assembly comprising:

an elongated rail member including an upper portion and a lower portion, the upper portion forming a flange projection, the lower portion including a mounting slot;

a carriage housing defining an inner cavity, the inner cavity sized to receive at least the flange projection of the elongated rail member;

at least one segment bearing mounted in the inner cavity of the carriage housing and engaging the flange projection of the elongated rail member; and a segment bearing stabilizer mounted within the inner cavity of the carriage housing and opposite the at least one segment bearing.

14. A linear motion bearing assembly comprising:

an elongated rail member including an elongated T-shaped mounting slot, an inner race portion and a flange projection substantially along a longitudinal length thereof; and a carriage housing mounting a plurality of bearings for movement along the inner race portion and flange projection of the elongated rail member, the carriage housing having a race portion on an inner cavity for receiving the plurality of bearings and the elongated rail member, wherein the plurality of bearings includes a linear motion bearing for movement along a first flange projection of the elongated rail member and a segment bearing stabilizer for movement along a second flange projection of the elongated rail member.

15. The linear motion bearing assembly according to claim 14, wherein the elongated rail member is monolithically formed with the elongated T-shaped mounting slot, the inner race portion and the flange projection substantially along the entire length thereof.

16. The linear motion bearing assembly according to claim 15, wherein the elongated rail member is monolithically formed to define the mounting slot.

17. The linear motion bearing assembly according to claim 14, wherein the carriage housing is formed with both upper and lower races for receiving the plurality of bearings.

18. The linear motion bearing assembly according to claim 17, wherein the carriage housing is monolithically formed to define at least one bearing race.

* * * * *